G. J. DEHN.
TRAP.
APPLICATION FILED FEB. 17, 1916.
1,281,147.
Patented Oct. 8, 1918.
2 SHEETS—SHEET 1.
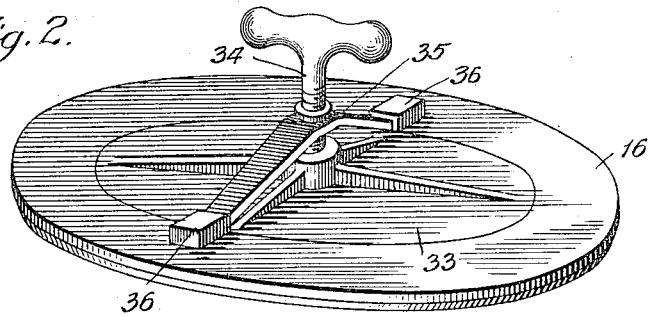
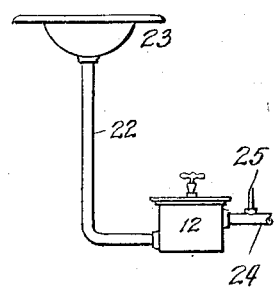
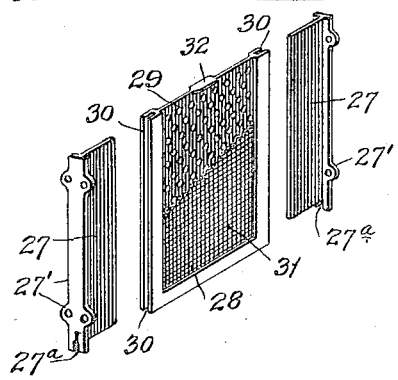
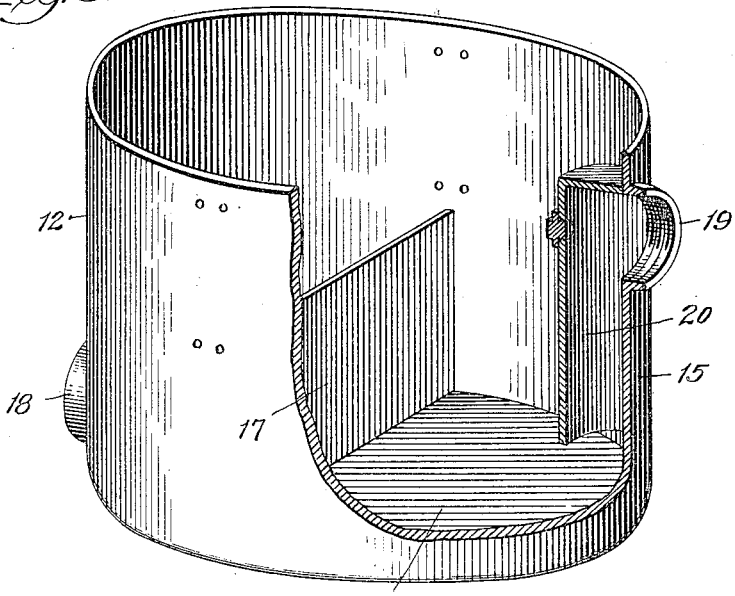
Witness:
John Enders
Inventor:
George J. Dehn
by Fred Gerlach
his Atty.

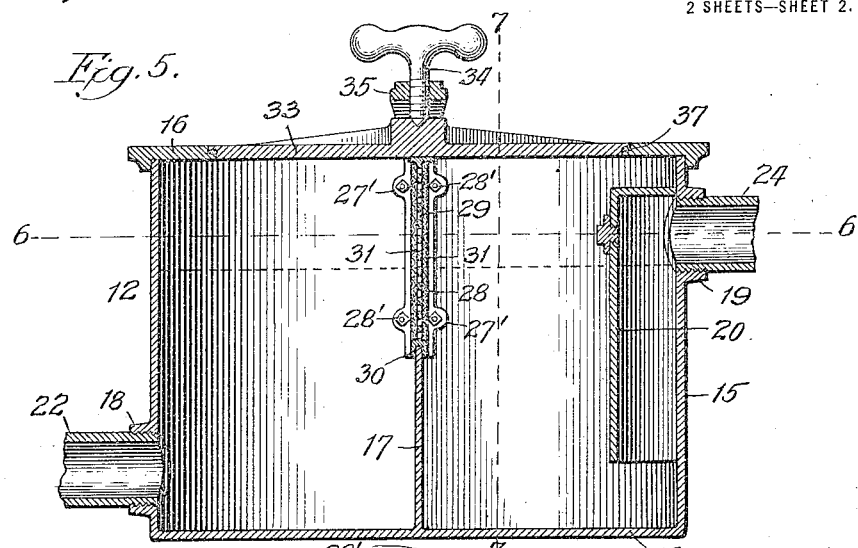
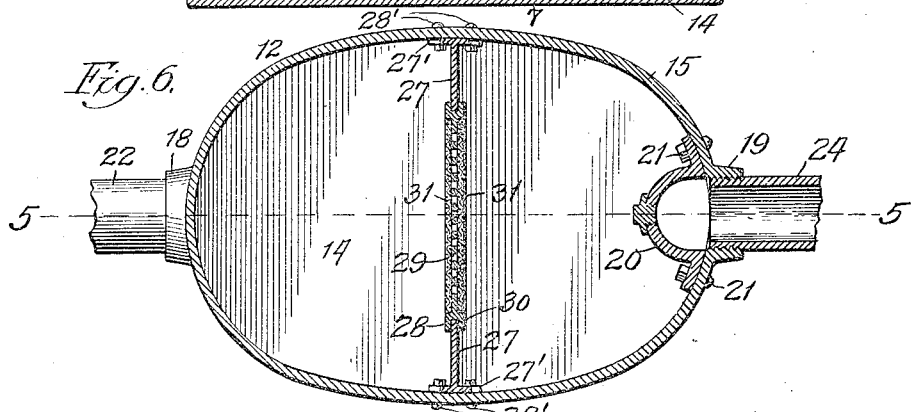
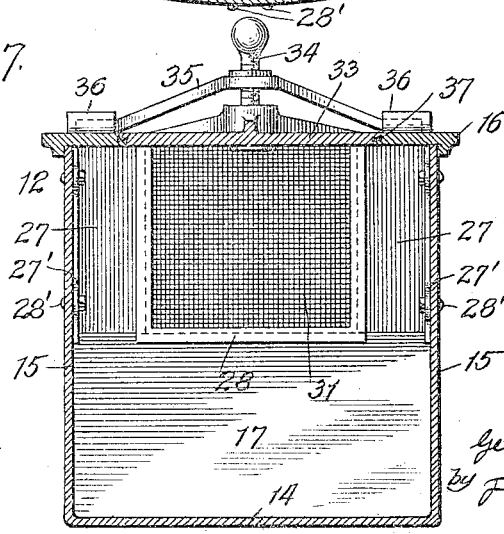

UNITED STATES PATENT OFFICE.

GEORGE J. DEHN, OF CHICAGO, ILLINOIS.

TRAP.

1,281,147.  Specification of Letters Patent.  Patented Oct. 8, 1918.

Application filed February 17, 1916. Serial No. 78,806.

*To all whom it may concern:*

Be it known that I, GEORGE J. DEHN, a citizen of the United States, and a resident of Chicago, in the county of Cook and State of Illinois, have invented certain new and useful Improvements in Traps, of which the following is a full, clear, and exact description.

The invention relates to traps designed more particularly for preventing hair, manicure clippings and the like from passing to the devices in drain systems which are likely to become clogged thereby.

In barber-shops and manicure parlors, it frequently occurs that hair, nail clippings and the like are discharged into the wash-bowl or lavatory. These are likely to accumulate in the traps and other devices of the drain system, until the proper flow of the drainage is interfered with.

One object of the invention is to provide a hair trap which is adapted to be installed in an exposed position where it is readily accessible for removal of the contents and whereby hair, clippings and the like will be trapped.

Another object of the invention is to provide an improved hair trap which is efficient in operation and may be readily cleaned.

The invention consists in the several novel features hereinafter set forth and more particularly defined by the claim at the conclusion hereof.

In the drawings: Figure 1 is an elevation of a drain-trap and its connections to a wash-bowl and to the drain system. Fig. 2 is a perspective of the cover of the basin of the trap. Fig. 3 is a perspective of the trap basin. Fig. 4 is a perspective of the removable strainer and the guides therefor. Fig. 5 is a central vertical longitudinal section of the trap. Fig. 6 is a horizontal section taken on line 6—6 of Fig. 5. Fig. 7 is a section taken on line 7—7 of Fig. 5.

The improved trap comprises a body or basin 12 having an integral bottom 14 and a side 15 and a top 16 suitably secured to the upper portion of the side 15, in manner well understood in the art. In practice, this body is usually finished or enameled to harmonize with the lavatory and fittings. A vertical cross-wall or baffle 17 is formed in the body and extends approximately half way to the top of the body. An inlet connection 18 is formed in the lower portion of the body at one side of the baffle and an outlet connection 19 is formed adjacent the top of the body on the opposite side of the baffle. A guide 20, secured to the inside of the body by bolts 21, extends downwardly from outlet connection 19 to receive drainage from the lower portion of the outlet chamber in the body. A pipe 22 from the basin or lavatory 23 conducts drainage to the inlet connection 18 of the trap. A discharge pipe 24 conducts the drainage from the outlet connection 19 to the drain-system. A vent-pipe 25 is usually connected to the pipe 24 adjacent the body 12.

Guides 27 are secured to the side of the basin 12 above the ends of the cross wall 17 respectively and these guides are secured to the basin by bolts 28' which pass through flanges 27' and the lower ends of these flanges are extended and grooved, as at 27$^a$ to straddle the upper edge of the baffle. These guides retain a removable strainer 28 in operative position above the baffle 17. This strainer comprises a perforated plate 29 having grooves 30 formed at its ends and bottom to receive the guides 27 and the upper portion of the cross-wall, respectively, and a sheet 31 of fine wire-gauze is soldered to each side of the perforated portion of the strainer-plate 29. The guides 27 and plate 29 are usually made of brass so as to provide a sliding fit between the plate and the guides to prevent corrosion, and so that joints between the guides and the plate will remain in condition to permit withdrawal of the strainer-plate when desired. A finger-piece or grip 32 is formed on the upper edge of plate 29. A removable cover 33 is secured in top 16 by a screw 34 which passes through a saddle 35 adapted to be held in lugs 36. A gasket 37 is placed between the lapped margins of the cover 33 and the opening in the top 16 to form a closure between them which will prevent escape of fluid from the chamber in the basin 12.

In operation, the drainage from the bowl 23 passes through pipe 22 into the lower portion of the chamber at the inlet side of wall 17 and the strainer. Any hair or clippings in the drainage will be retained in that chamber by the gauze on the strainer. The liquid of the drainage will pass through the gauze to the chamber on the discharge-side of wall 17 and be conducted from a point near the bottom of the basin 12 by guide 20 to the discharge pipe 24. The baffle prevents direct flow of the drainage through the basin 12. Normally, a body of drainage will be retained in both the inlet and outlet chambers of the trap up to the level of the outlet, forming a water-seal which will prevent gas from passing backwardly through pipe 22 to the bowl 23. If, from any unforeseen cause, the water on the outlet side of baffle 17 should be siphoned out of that chamber, a body of water will still remain on the inlet side, approximately up to the level of the top of the baffle, and thus a water-seal for the inlet chamber and connection 18 will always be provided.

In practice, it has been found that if wire gauze of sufficiently fine mesh, to arrest hair, is employed, it has insufficient inherent strength to be durable. To render the strainer durable, the gauze is soldered to the perforated plate which serves to reinforce it. In practice, it has also been found that when a single thickness of gauze is used, hair will sometimes pass through it and to more efficiently prevent the hair from being carried through the strainer with the drainage, the plurality of sheets of fine gauze separated by the perforated plate, as before described, are employed. For example, if a hair or clipping should happen to be directed through an opening in the gauze at the inlet side of the strainer, it will most likely encounter a wire in the gauze at the other side and in this manner efficiency in trapping is attained.

When it is desired to clean the trap and remove the accumulated hairs, etc., the cover 33 is removed so that the strainer, in its entirety, may be withdrawn and cleansed. When the strainer is removed, the residue in the body of the trap may be more readily removed through the opening in the top of the basin, and if there are accumulations of slime, the cover 33 can be replaced while the strainer is removed, so that when water is forced through the trap, it will flush the trap and carry off the slime.

The invention is not to be understood as restricted to the details set forth, since these may be modified within the scope of the appended claim, without departing from the spirit and scope of the invention.

Having thus described the invention, what I claim as new and desire to secure by Letters Patent, is:

In a hair trap, the combination of a basin, having an opening in its top, a cover, means for removably securing the cover to close said opening, inlet and outlet connections for the drainage connected to the basin at opposite points, a baffle extending transversely across the lower portion of the chamber in the basin and extending to a point somewhat below the line of the outlet connection, guides separately formed from the basin and extending from the top thereof to the baffle, and a hair strainer slidably held in the guides and extending between the top of the baffle and the cover of the basin.

GEORGE J. DEHN.

Copies of this patent may be obtained for five cents each, by addressing the "Commissioner of Patents, Washington, D. C."